US008495192B2

(12) United States Patent
Maegawa et al.

(10) Patent No.: US 8,495,192 B2
(45) Date of Patent: Jul. 23, 2013

(54) DISTRIBUTED PROCESSING METHOD, DISTRIBUTED PROCESSING SYSTEM, SERVER, PROGRAM FOR THE SAME, COMPUTER, AND PROGRAM FOR THE SAME

(75) Inventors: Hirotoshi Maegawa, Tokyo (JP); Koji Kageyama, Kanagawa (JP); Masayuki Chatani, Tokyo (JP); Yoichi Numata, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 843 days.

(21) Appl. No.: 12/526,168

(22) PCT Filed: Feb. 28, 2007

(86) PCT No.: PCT/JP2007/000140
§ 371 (c)(1),
(2), (4) Date: Nov. 24, 2009

(87) PCT Pub. No.: WO2008/105028
PCT Pub. Date: Sep. 4, 2008

(65) Prior Publication Data
US 2010/0138769 A1 Jun. 3, 2010

(51) Int. Cl.
*G06F 15/173* (2006.01)
(52) U.S. Cl.
USPC ............ 709/223; 709/203; 709/217; 709/224
(58) Field of Classification Search
USPC .............. 709/203, 217, 223, 224; 718/1, 104
See application file for complete search history.

(56) References Cited

U.S. PATENT DOCUMENTS

| | | | | |
|---|---|---|---|---|
| 6,038,543 A * | 3/2000 | Kurosawa | ................... | 705/7.13 |
| 6,678,698 B2 * | 1/2004 | Fredell et al. | ................. | 707/608 |
| 7,155,700 B1 * | 12/2006 | Sadhu et al. | ................. | 717/103 |
| 7,461,347 B2 * | 12/2008 | Zhu et al. | ....................... | 715/751 |
| 7,640,506 B2 * | 12/2009 | Pratley et al. | ................. | 715/751 |
| 7,716,263 B2 * | 5/2010 | Masek | ........................ | 715/751 |
| 7,996,257 B2 * | 8/2011 | Brooks | ...................... | 705/14.42 |
| 8,069,237 B2 * | 11/2011 | Yoshida et al. | ............... | 709/223 |

(Continued)

FOREIGN PATENT DOCUMENTS

| | | | |
|---|---|---|---|
| JP | 2001325041 A | 11/2001 |
| JP | 2001325238 A | 11/2001 |

(Continued)

OTHER PUBLICATIONS

International Search Report for corresponding PCT application PCT/JP2007/000140 dated Apr. 24, 2007.

(Continued)

*Primary Examiner* — Lashonda Jacobs
(74) *Attorney, Agent, or Firm* — Matthew B. Dernier, Esq.; Gibson & Dernier LLP

(57) ABSTRACT

A distributed processing management server receives resource operating status information from a terminal apparatus and generates based upon the information a whole resource operating status information which indicates operating statuses of other terminal apparatuses and feeds the information back to the terminal apparatuses. Users of terminal apparatuses can grasp how other terminal apparatuses are involved in a distributed processing project and motivation can be enhanced for participating in the distributed processing project.

13 Claims, 16 Drawing Sheets

U.S. PATENT DOCUMENTS

| | | |
|---|---|---|
| 2002/0116443 A1 | 8/2002 | Seki et al. |
| 2003/0061330 A1* | 3/2003 | Frisco et al. .................. 709/223 |
| 2003/0105657 A1* | 6/2003 | Nandigama et al. .............. 705/9 |
| 2003/0187664 A1* | 10/2003 | Bonebrake ........................ 705/1 |
| 2005/0114528 A1* | 5/2005 | Suito ............................. 709/228 |
| 2006/0026282 A1 | 2/2006 | Seki et al. |
| 2006/0230122 A1* | 10/2006 | Sutou et al. ................... 709/219 |
| 2008/0147695 A1* | 6/2008 | Masek .......................... 707/101 |
| 2008/0195464 A1* | 8/2008 | Brooks .......................... 705/11 |

FOREIGN PATENT DOCUMENTS

| | | |
|---|---|---|
| JP | 2002244870 A | 8/2002 |
| JP | 2004302741 A | 10/2004 |
| JP | 2006216058 A | 8/2006 |

OTHER PUBLICATIONS

International Preliminary Report on Patentability for corresponding PCT application PCT/JP2007/000140, Sep. 1, 2009.

* cited by examiner

DISTRIBUTED PROCESSING METHOD, DISTRIBUTED PROCESSING SYSTEM, SERVER, PROGRAM FOR THE SAME, COMPUTER, AND PROGRAM FOR THE SAME

TECHNICAL FIELD

This invention relates to a distributed processing method, which grasps operating status of a resource to which distributed processing is performed, a distributed processing system, a server, a program of the same, a computer, and a program of the same.

BACKGROUND ART

For example, there is a project which performs the distributed processing of the application processing which needs huge amount of operations, such as a prediction for folding of protein (protein structure prediction), the decipherment of the code by all search using resource of a plurality of computers connected on the network.

In such a project, the participation to the project concerned is collected using the technique of exhibiting the total result of application processing by Web, etc. The total result concerned indicates the advance status of the above mentioned application processing, etc. for example.

Japanese Patent Publication No. 2006-216058

However, in the conventional technique mentioned above, the project participant cannot grasp other participant's operating status and processing status except for himself, and there is a problem it is insufficient for enhancing the motivation to participate in the project.

SUMMARY OF THE INVENTION

This invention is made in view of this situation, and the purpose is to provide a distributed processing method, a distributed processing system, a server, a program, and a recording medium which can enhance motivation to participate in the project which performs distributed processing of a predetermined application.

In order to solve the problem of the conventional art mentioned above and to attain the purpose, the first aspect o the present invention is a distributed processing method performing distributed processing of a predetermined application processing by a plurality of terminal apparatuses comprising, the steps of: a distributed processing step in which said plurality of terminal apparatuses perform distributed processing of the data concerning said application processing provided by a fist server, and provide said first server with a result of the processing; a transmitting step in which said plurality of terminal apparatuses transmit an operating status data indicating operating status of said plurality terminal apparatuses from said plurality of terminal apparatuses to a second server; and an operating status transmitting step in which said second server generates a whole operating status data indicating said operating status of said plurality of terminal apparatuses on the basis of said operating status data received from said plurality of terminal apparatuses in said transmitting step, and transmits said whole operating status data to said terminal apparatus.

In the distributed processing method of the first aspect o the present invention, since said terminal apparatuses obtain said whole operating status data generated by said second server, operating status of said plurality terminal apparatuses can be grasped based on it to enhance user's motivation to participate in the project of distributed processing.

The second aspect o the present invention is a distributed processing system, comprising: a plurality of terminal apparatus; a first server which makes said plurality of terminal apparatuses perform distributed processing of a predetermined processing; and a second server which receives an operating status data indicating operating status of said terminal apparatus from said plurality of said terminal apparatuses, generates a whole operating status data indicating said operating status of said plurality of terminal apparatuses based on the received operating status data, and transmits said whole operating status data to said terminal apparatus.

The third aspect of the present invention is a server managing a plurality of terminal apparatuses which perform distributed processing of a predetermined application processing, comprising: an interface for receiving an operating status data indicating operating status of said terminal apparatus from said plurality of terminal apparatuses; and a processing circuit for generating a whole operating status data indicating said operating status of said plurality of terminal apparatuses on the basis of said operating status data received by said interface, and transmits said whole operating status data to said terminal apparatus through said interface.

The fourth aspect of the present invention is a program which is executed by a sever managing a plurality of terminal apparatuses performing distributed processing of a predetermined application, comprising the steps of: receiving step for receiving an operating status data indicating operating status of said terminal apparatus from said plurality of terminal apparatuses; generating step for generating a whole operating status data indicating said operating status of said plurality of terminal apparatuses based on said operating status data received in said receiving step; and transmitting step for transmitting said whole operating status data generated in said generating step to said terminal apparatus.

The fifth aspect of the present invention is a storage media for storing a program which is executed by a sever managing a plurality of terminal apparatus performing distributed processing of the predetermined application, said program comprising the steps of: receiving step for receiving an operating status data indicating operating status of said terminal apparatus from said plurality of terminal apparatuses; generating step for generating a whole operating status data indicating said operating status of said plurality of terminal apparatuses based on said operating status data received in said receiving step; and transmitting step for transmitting said whole operating status data generated in said generating step to said terminal apparatus.

The sixth aspect of the present invention is a computer comprising: an interface for receiving a progress status data indicating progress status of application processing to which distributed processing has been performed and a whole operating status data indicating said operating status of a plurality of computers executing said application processing; and a processing circuit for generating image information which displays a first image according to said progress status data received by said interface, and a second image according to said operating status data.

According to the present invention can provide a distributed processing method, a distributed processing system, a server, a program, and a recording medium which can enhance motivation to participate in the project which performs distributed processing of a predetermined application.

DETAILED DESCRIPTION OF THE INVENTION

Below a distributed processing system of the present invention will be explained.

First Embodiment

Figure 1:
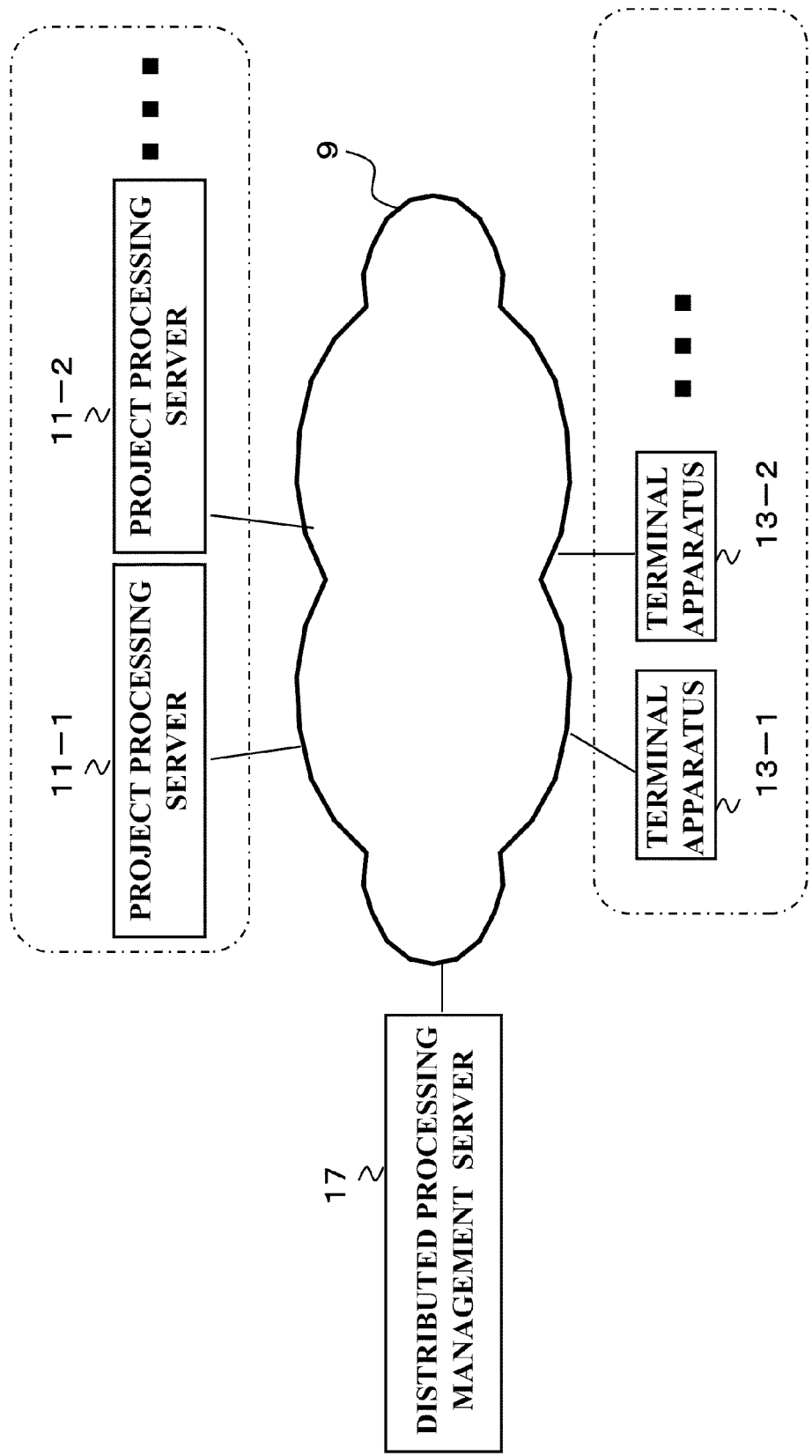
FIG. 1 is a schematic view of a distributed processing system in accordance with a first embodiment of the present invention.

FIG. 1 is a schematic view of a distributed processing system in accordance with a first embodiment of the present invention.

Referring to FIG. 1, the distributed processing system, for example, includes one or more project processing server 11-$n$, a plurality of terminal apparatuses 13-$m$ and a distributing processing management server 17.

Here "n" is an integer meeting the condition "$1 \leq n \leq N$". Further "m" is an integer meeting the condition "$1 \leq n \leq M$".

The project processing servers 11-$n$ is an example of a first server used in the present invention, the distributed processing management server 17 is an example of a second server used in the present invention. Further the terminal apparatus 13-$m$ is an example of a terminal apparatus used in the present invention.

Figure 2:
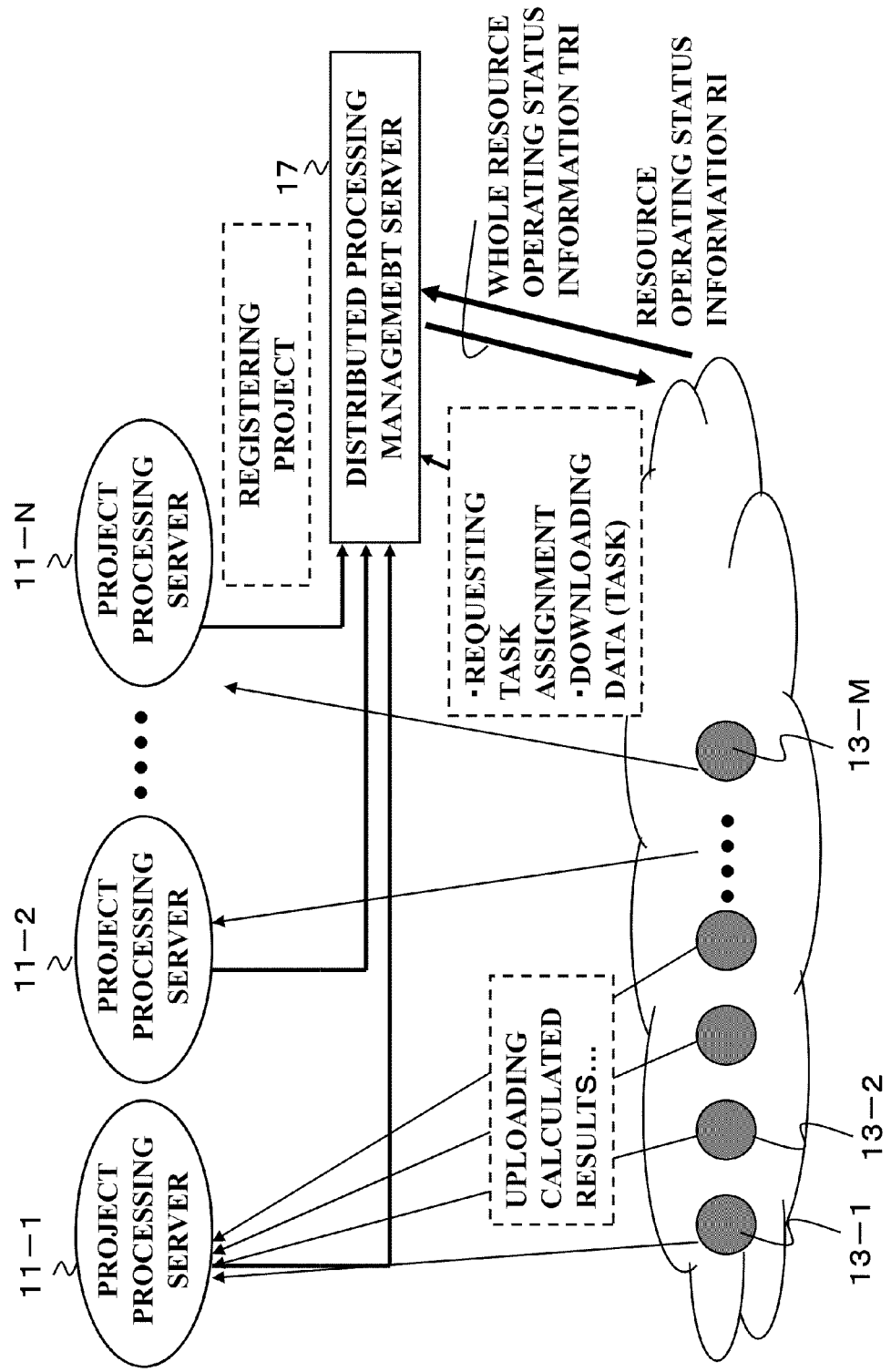
FIG. 2 is a schematic view of operation of the distributed processing system illustrated in FIG. 1.

FIG. 2 is a schematic view of operation of the distributed processing system illustrated in FIG. 1.

In the distributed processing system, for example, as shown in FIG. 2, a plurality of the terminal apparatuses 13-$m$ register the resource thereof to the distributed processing management server 17 as a resource to be used for the registered distributing processing project. Then the terminal apparatus 13-$m$, for example, requests for a task allocation (ready notice) to the distributed processing management server 17, then downloads the task (data) of the distributed processing project through though the distributed processing management server 17. Hear the distributed processing project is an example of a predetermined application processing of the present invention.

The terminal apparatus 13-$m$ executes the downloaded task, and uploads the results to the project processing servers 11-$n$. The terminal apparatus 13-$m$ notices information indicating a resource operating condition, for example time, etc. in which the resource of the terminal apparatus 13-$m$ has been used for the task.

On the other hand, the project processing server 11-$n$ registers the distributed processing project to the distributed processing management server 17. In accordance with the registration, the project processing server 11-$n$ is authorized to use the resource of the terminal apparatus 13-$m$ which is managed by the distributed processing management server 17.

Then, the project processing server 11-$n$ transmits the task of the distributed processing project to the distributed processing management server 17.

Further a result of the task processed by the terminal apparatus 13-$m$ is uploaded to the project processing servers 11-$n$ from the terminal apparatus 13-$m$.

In the distributed processing system, the distributed processing management server 17 generates the whole resource operating condition information (statistical information) TRI on the basis of the resource operating condition information RI received from the terminal apparatus 13-$m$ and feeds this back to the terminal apparatus 13-$m$.

As a result, users of the terminal apparatus 13-$m$ can keep track how the other terminal apparatuses 13-$m$ are associated with the distributed processing project to enhance motivation for taking part in the distributed processing project.

[[Project Processing Server 11-$n$]]

The project processing server 11-$n$, for example, manage the processing relating to a predetermined distributing processing project for which the terminal apparatuses 13-$m$ are made to perform distributed processing.

For example, the project processing server 11-$n$ are operated by different entrepreneurs respectively.

Each of the project processing servers 11-$n$ distributes the task relating to the distributed processing project to the terminal apparatus 13-$m$ through the distributed processing management server 17.

On the other hand, each of the project processing servers 11-$n$ receives a result of calculation of the task by the terminal apparatus 13-$m$ from the terminal apparatus 13-$m$ using direct uploading. Note that, the project processing server 11-$n$ may receive the result of calculation of the task through the distributed processing management server 17.

Further as a unique subject of distributed processing, there is a risk that a client, etc. is altered and the result of intentional mistaken calculation is send to the server. Therefore, the project processing server 11-$n$ has the measure function of making a communication method not open and making the same calculation perform to a plurality of clients, etc.

As the project, there is, for example, a project of distributed computing which predicts for folding of protein (protein structure prediction), the petition of the privacy protection by decryption using all the search, the project which the mathematical difficult problem proves by all the search, the project which extracts an un-natural signal from the signal which comes from outside of the earth, and looks for an extraterrestrial life object, and a molecule analysis project for development of drug for cancer treatment, etc.

The project processing server 11-$n$ generates the project progress status information indicating the progress status of the whole distributed processing project, for example, based on the calculation result received from the terminal apparatus 13-*m*, and transmits this to the terminal apparatus 13-*m*.

In addition, based on the project progress status information, the project processing server 11-*n* may generate image information by which the project progress status can be grasped visually, and may transmit the image information to the terminal apparatus 13-*m*.

[Terminal Apparatus 13-*m*]

The terminal apparatus 13-*m* is a calculation processing apparatus which an operating status thereof is managed by the distributed processing management server 17.

Figure 3:
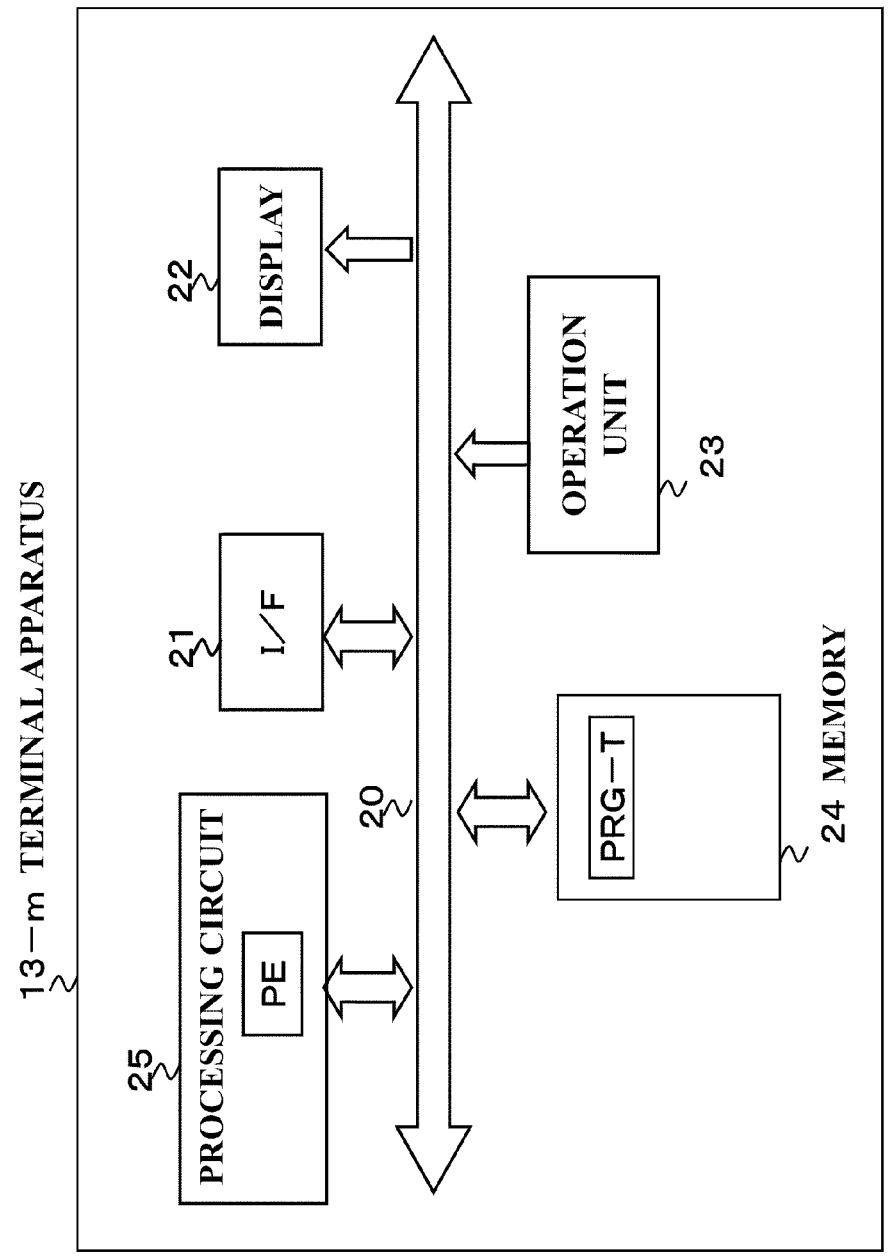
FIG. 3 is a block diagram of a terminal apparatus illustrated in FIG. 1.

FIG. 3 is a block diagram of a terminal apparatus 13-*m* illustrated in FIG. 1.

As shown in FIG. 3, the terminal apparatus 13-*m* includes, for example, an interface 21, a display 22, an operation unit 23, a memory 24, and a processing circuit 25.

The interface is an interface for transmitting and receiving data between the project processing servers 11-*n* and distributed processing management server 17 through the network 9.

The display 22 displays a screen according to the image data which the processing circuit 25 generated as described later.

The operation unit 23 is operation means, such as a keyboard and a controller.

The memory 24 stores a program PRG-T. Here, the memory 24 is any recording media, such as semiconductor memory, an optical disc, a magneto-optical disc, and a magnetic disk, and so on.

The processing circuit 25 reads out the program PRG-T from the memory 24, and controls generally processing of the terminal apparatus 13-*m* explained in this embodiment.

The processing circuit 25, for example, includes a plurality of processing elements (PE).

Figure 4:
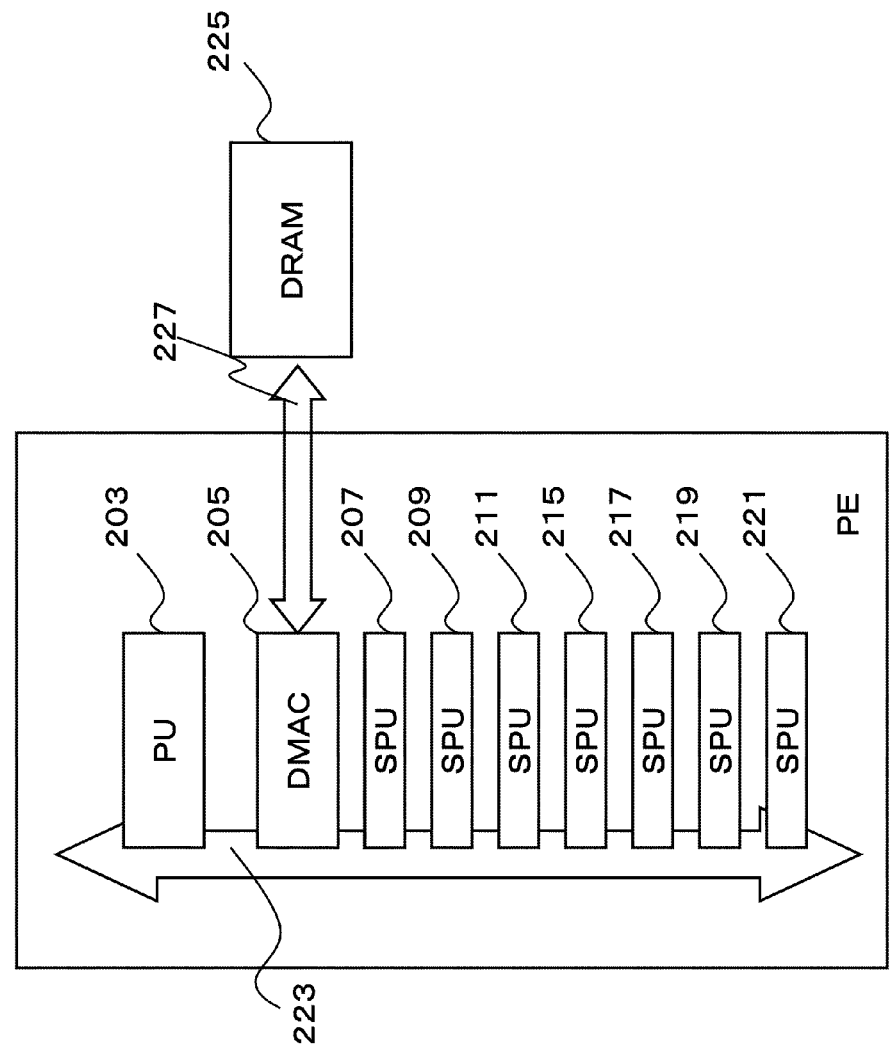
FIG. 4 is a block diagram of a PE of a processing circuit illustrated in FIG. 3.

FIG. 4 is a block diagram of PE of a processing circuit 25 illustrated in FIG. 3.

As shown in FIG. 4, the PE includes a Processor Unit (PE) 203, a Direct Memory Access Controller (DMAC) 205, a plurality of processors units (SPU) which are different in the PU, such as SPU 209, SPU211, SPU213, SPU215, SPU217, SPU219, SPU22. The PE bus 223 connects the SPU, the DMAC 205, and the PU 203 mutually.

Though the PE can be configured by various methods realizing digital logical circuits, it is desirable to configure the PE as a single integrated circuit. The PE is connected to a dynamic access memory (DRAM) 225 through a high-frequency memory connection 227. The DRAM 225 functions as a main memory of the PE. The DMAC 205 enables elements such as the PU 203 and the SPU 207 to perform direct memory access (DMA) to the DRAM 225.

The PU203 controls elements such as the SPU207 by providing DMA commands to the DMAC205. At this time, the PU treats a processor such as the SPU 207 as an independent processor. Therefore, in order to control operations performed by a processor such as the SPU207, the PU uses commands similar to remote procedure calls (hereafter called RPC). The PU203 executes RPC by providing a series of DMA commands to the DMAC 205. The DMAC 205 loads a program necessary for an SPU to execute a requested task and loads related data into a local storage of the SPU. This program is hereafter called an SPU program. After that, the PU203 provides the first kick command to the SPU to execute the SPU program.

The PU203 forms communication modules and various functions which control self-controllable SPUs such as SPU207, SPU209, SPU211, SPU213, SPU215, SPU217, SPU219, and SPU221 and SPUs which a PU of other PE controls.

Figure 5:
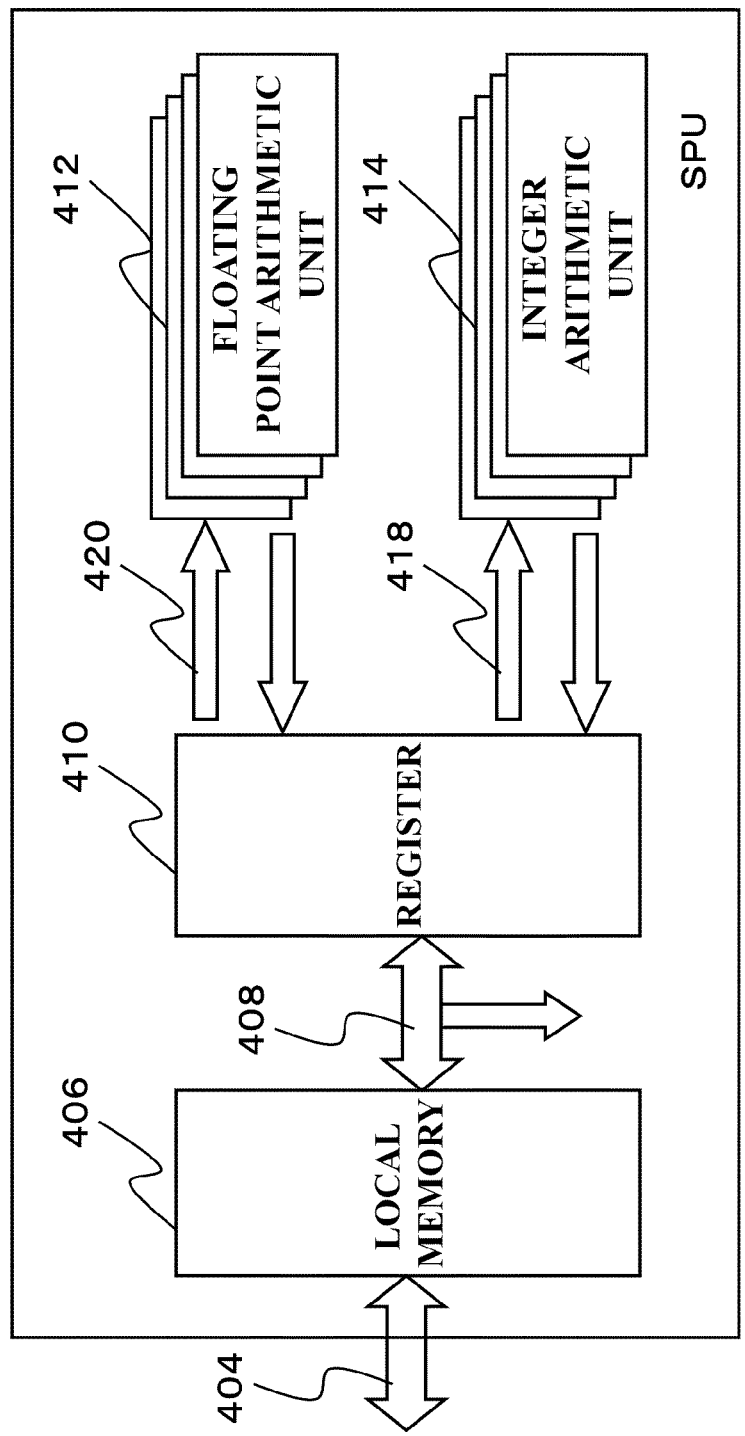
FIG. 5 is a block diagram of SPU illustrated in FIG. 4.

Next a detailed structure of the SPU as shown in FIG. 5 will be described. An SPU 402 includes a local memory 406 which serves as a local storage for storing data to be processed in the SPU and various threads to be executed in the SPU, a register 410, a plurality of floating-point arithmetic units 412, and a plurality of integer arithmetic units 414. The number of the floating-point arithmetic units 412 and the integer arithmetic units 414 can be optionally determined according to required processing-capability.

The local memory 406 is preferably configured as an SRAM. The SPU402 includes a bus 404 which receives and sends results of various executed threads, requests for tasks, and results of executed tasks. The SPU 402 also includes internal buses such as 408, 420, and 418. The internal bus 408 couples the local memory 406 to the register 410. The internal buses 420 and 418, respectively, couples the register 410 to the floating-point unit 412, and the register 410 to the integer unit 414.

Note that, The processing circuit 25 shown in FIG. 3 uses an absolute timer (the diagram of the circuit 25 is not shown). The absolute timer outputs a clock signal to all the elements except for the SPU and the PU. The clock signal is independent from and faster than a clock signal driving these elements. The absolute timer determines a time budget (assigned time) which affects SPU's task performance. The time budget sets finished time of a task, which is greater than time necessary for processing the task. Consequently, there are busy time and standby time in a period of the time budget of each task. The SPU program is designed to perform an operation based upon the time budget regardless of SPU's actual processing time.

[Distributed Processing Management Server 17]

The distributed processing management server 17 assigns tasks of the distributed processing project to the project processing server 11-*n* and manages operating status of the terminal apparatus 13-*m*.

Figure 6:
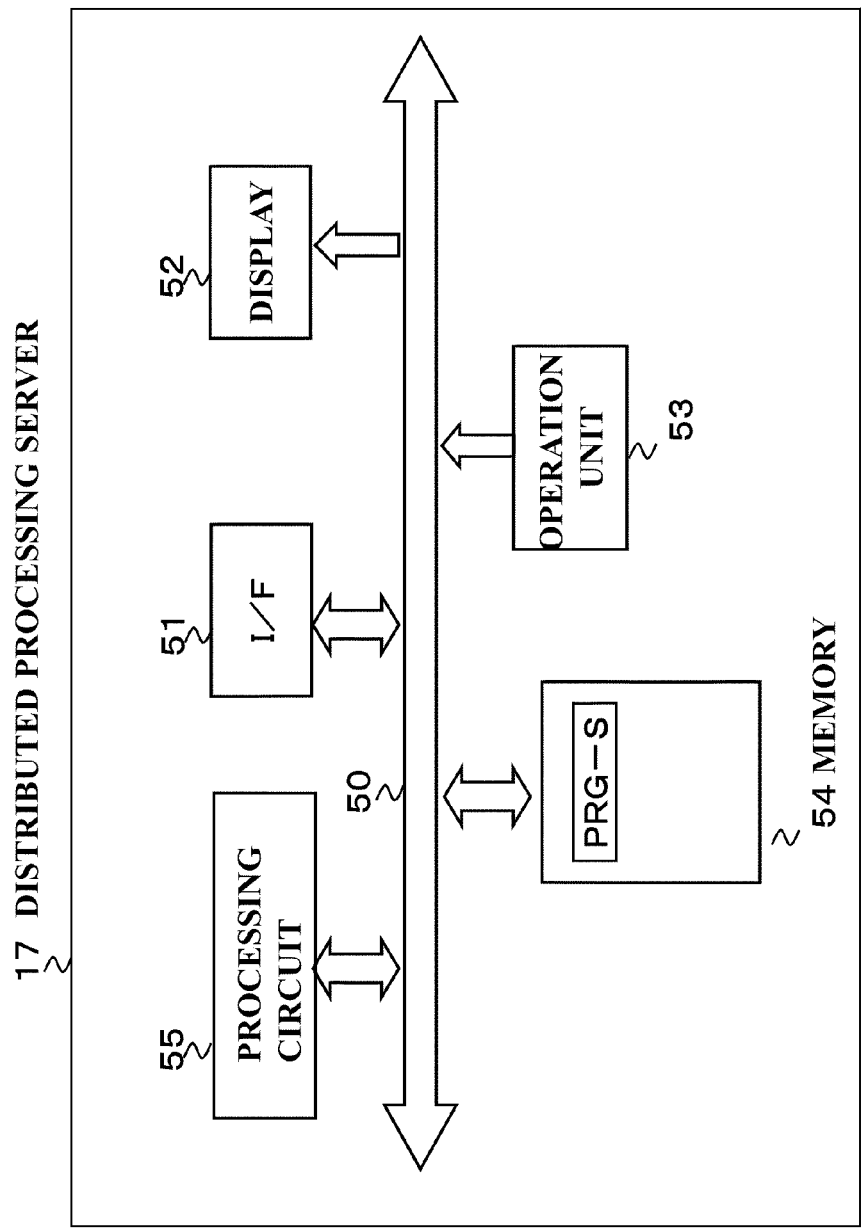
FIG. 6 is a block diagram of a distributed processing server illustrated in FIG. 1.

FIG. 6 is a block diagram of the distributed processing management server 17 as shown in FIG. 1.

As shown in FIG. 6, the distributed processing management server 17 includes, for example, an interface 51, a display 52, an operation unit 53, a memory 54, and a processing circuit 55.

The interface 51 is an interface for transmitting and receiving data between the project processing server 11-*n* and the terminal apparatus 13-*m* through the network 9.

The display 52 displays a screen according to the image data which the processing circuit 55 generates. The operation unit 53 is an operation means such as a keyboard.

The memory 54 stores a program PRG-S. The memory 54 is any of recording media such as a semiconductor memory, an optical disc, a magneto-optical disc, a magnetic disk, and so on.

The processing circuit 55 reads out the program PRG-S from the memory 54 and controls generally processing of the distributed processing management server 17.

The processing circuit 55, as described below, performs introduction processing which introduces the distributed processing project of the project processing server 11-*n* to the terminal apparatus 13-*m*; providing processing which provides information on the SPU which is resources of the terminal apparatus 13-*m* to the project processing server 11-*n*; assignment processing which assigns distributed processing to a terminal apparatus 13-*m*; and transmission processing which transmits the whole resource operating status information which indicates operating status of all the terminal apparatuses 13-*m* to terminal apparatuses 13-*m*.

Specifically, the processing circuit 55, as described later, receives the resource operating status information RI from the terminal apparatus 13-*m*. And the processing circuit 55 generates, based upon the resource operating status information RI received from the terminal apparatus 13-*m*, the whole resource operating status information TRI which indicates operating status of all the terminal apparatuses 13-*m* participating in the distributed processing of the project. Then the processing circuit 55 feeds the information TRI back to the terminal apparatus 13-*m*. The generation of the information TRI and its feedback performed by the processing circuit 55 are performed, for example, at a given interval of time.

This resource operating status information RI includes, for example, a period of time which a terminal apparatus 13-*m* has used the SPU (processing circuit), starting time, ending time of distributed processing, and IP address.

The following describes an operation example of the distributed processing system shown in FIG. 1.

[Initial Operation]

Figure 7:
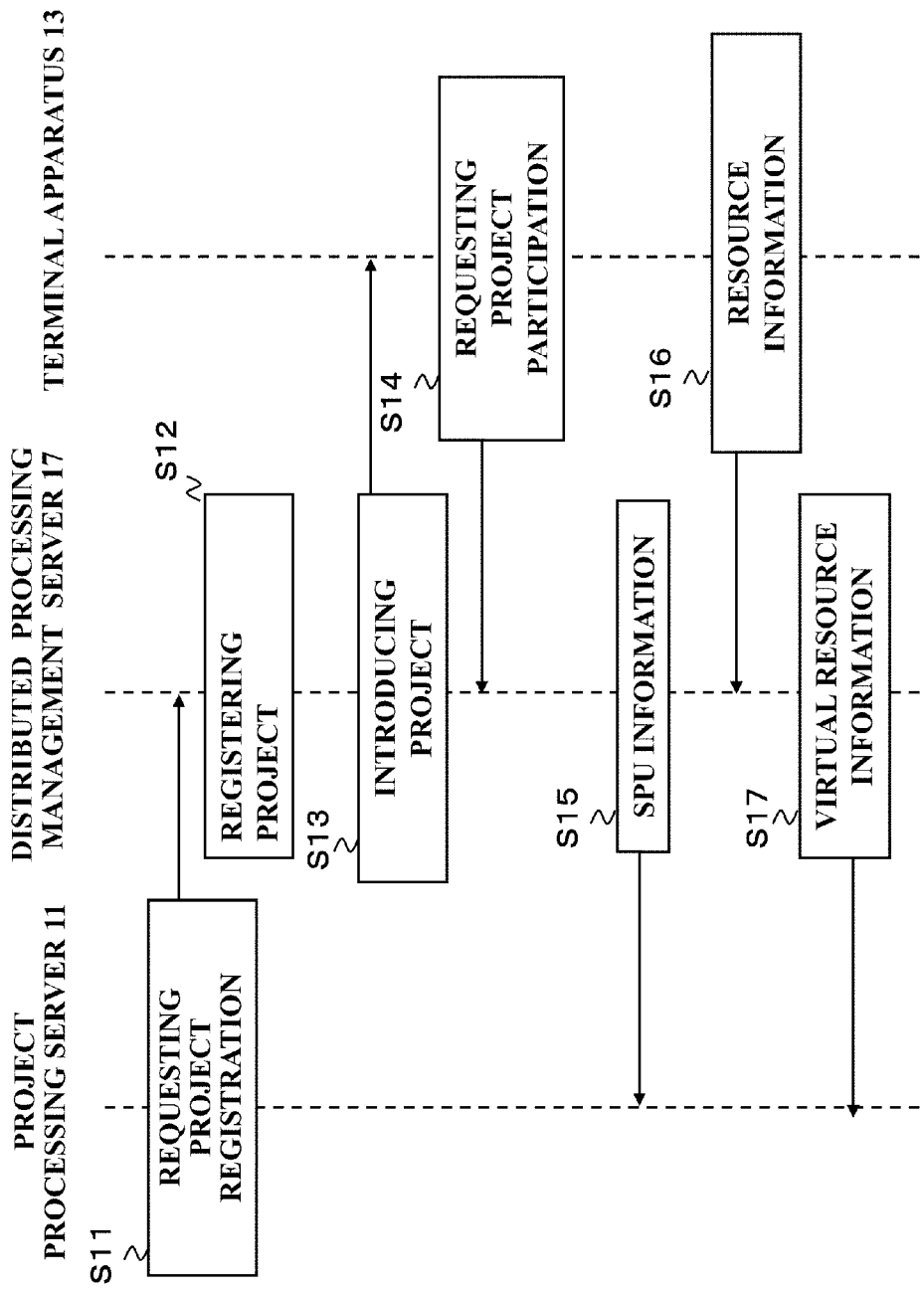
FIG. 7 is a flowchart of initial operation of the distributed processing system illustrated in FIG. 1.

FIG. 7 is a flowchart of an example of the initial operation performed by the distributed processing system.

Step S11:

A project processing server 11-*n* transmits a registration request for registering a project of distributed processing (project distributed processing) to the distributed processing management server 17. The registration request includes, for example, information of a project administrator, processed content of the project, etc.

Step S12:

The distributed processing management server 17 receives the registration request from the project processing server 11-*n* through the interface 51 shown in FIG. 6.

The processing circuit 55 of the distributed processing management server 17 determines whether the project meets given conditions based upon the received registration request. When the project meets given conditions, it is registered.

Step S13:

The distributed processing management server 17 transmits information on the registered project to the terminal apparatus 13-*m*.

Step S14:

The processing circuit 25 of the terminal apparatus 13-*m* displays, for example, information received from the distributed processing management server 17 in step S13, on the display 22 shown in FIG. 3.

A user selects a project which he wants to participate in by operating the operation unit 23, and the processing circuit 25 transmits a project participation request for participating in the selected project to the distributed processing management server 17.

Each terminal apparatus 13-*m* may send project participation requests for participating in a plurality of projects.

Step S15:

The processing circuit 55 of the distributed processing management server 17 transmits SPU information, which is information necessary for using an SPU of the processing circuit 25 of the terminal apparatus 13-*m*, to the project processing server 11-*n* through the interface 51.

The project processing server 11-*n* stores the received SPU information and uses it in distributed processing of the project.

Step S16:

The processing circuit 25 of the terminal apparatus 13-*m* transmits own resource information to the distributed processing management server 17 through the interface 21.

The resource information includes, for example, processing capability of the processing circuit 25, available memory capacity of the memory 24, communication environment, etc.

The distributed processing management server 17 stores the resource information received from the terminal apparatus 13-*m* into the memory 54.

Step S17:

The distributed processing management server 17 generates virtual resource information which enables the project processing server 11-*n* to use all the terminal apparatuses 13-*m* based upon the resource information received from the terminal apparatus 13-*m* and transmits the virtual resource information to the project processing server 11-*n*.

[Operation of Distributed Processing of a Project]

Figure 8:
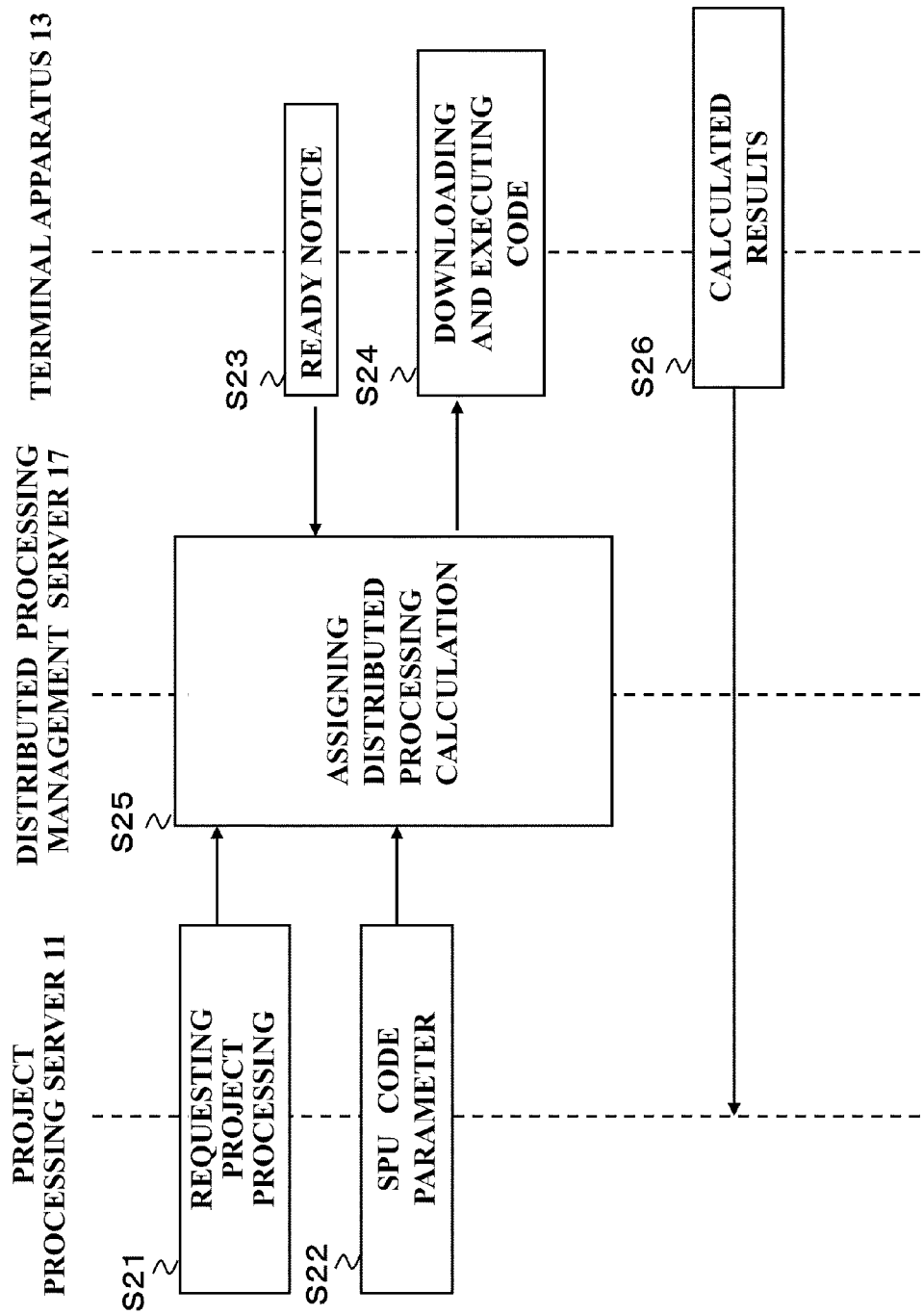
FIG. 8 is a flowchart of distributed processing of a project of the distributed processing system illustrated in FIG. 1.

FIG. 8 is a flowchart of operation of distributed processing of a project executed by a distributed processing system.

Step S21:

The project processing server 11-*n* transmits a project-processing request to the distributed processing management server 17.

Step S22:

The project processing server 11-*n* generates, based upon the SPU information received in step S15 shown in FIG. 7, SPU code and parameters which are adaptable to the distributed processing of the project.

Step S23:

The processing circuit 25 of the terminal apparatus 13-*m* transmits a ready-status notice (a task request) to the distributed processing management server 17 when the project distributed processing is possible.

The notice is transmitted, for example, when the terminal apparatus 13-*m* is powered on or is in status of non-operation of a given period.

Step S24:

The terminal apparatus 13-*m* downloads the SPU code and parameters from the distributed processing management server 17 and writes them in the memory 24.

The processing circuit 25 of the terminal 13*m* reads out the SPU code and parameters from the memory 24 and performs calculation in turn.

Step S25:

When the processing circuit 55 of the distributed processing management server 17 receives the project-processing request in step S21, the processing circuit 55 designates a terminal apparatus 13-*m* participating in the project and starts a program to perform the distributed processing.

Then the processing circuit 55 of the distributed processing management server 17 makes a terminal apparatus 13-*m* download the SPU code and parameters received from the project processing server 11-*n* in step S22, among the terminal apparatuses 13-*m* participating in the distributed processing of the project and having received the ready-status notice in step S23, Processing in steps of S22 to S25 is performed in parallel.

Step S26:

The processing circuit 25 of the terminal apparatus 13-*m* transmits the results calculated in step S24 to the project processing server 11-*n*.

The project processing server 11-*n* stores the calculated results received from the terminal apparatus 13-*m*.

[Management Operation for Resource Using Status]

Figure 9:
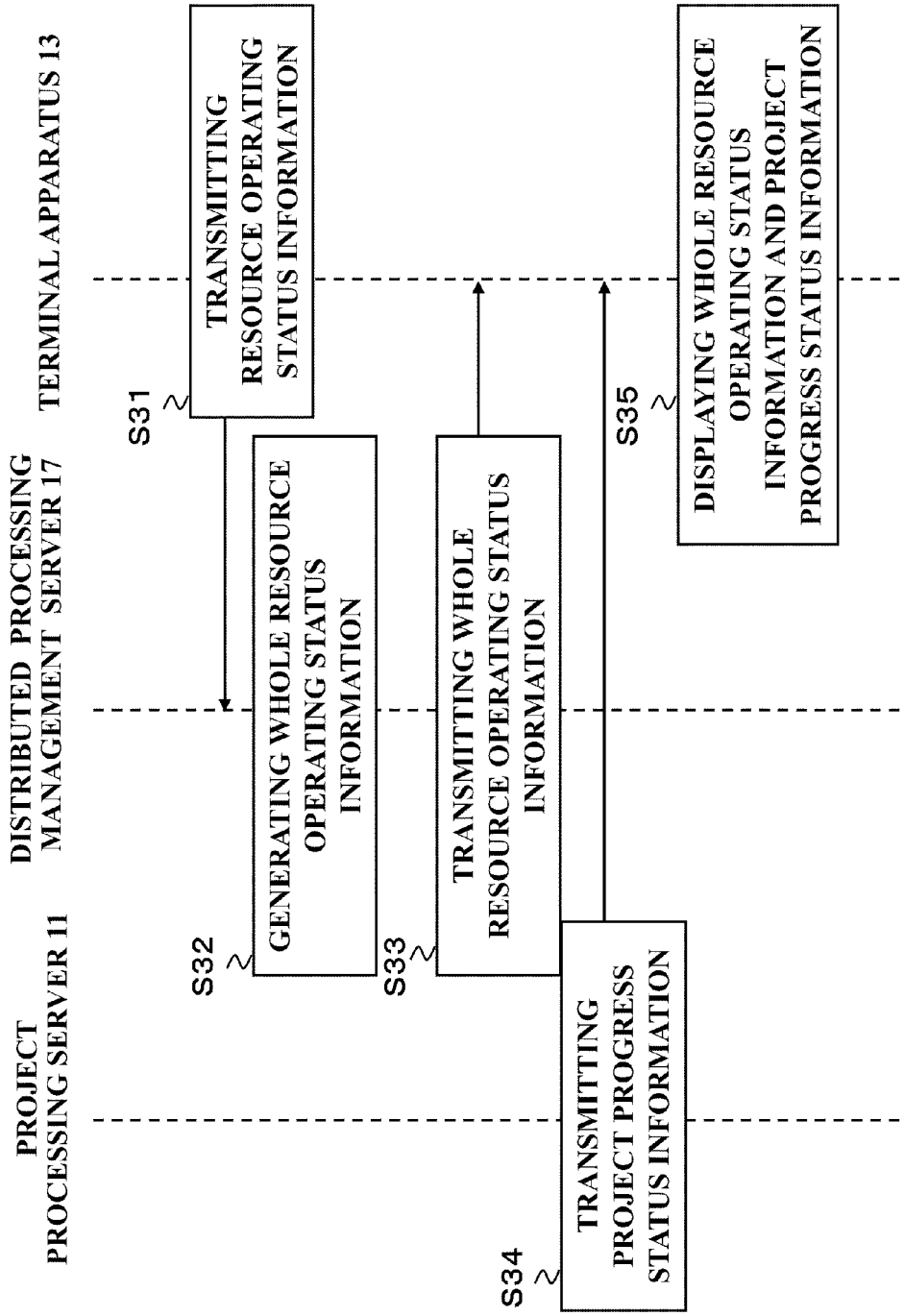
FIG. 9 is a flowchart of resource operating status operation of the distributed processing system illustrated in FIG. 1.

FIG. 9 is a flowchart which describes management operation for resource using status of the distributed processing system of FIG. 1.

Step S31:

The processing circuit 25 of the terminal apparatus 13-*m* generates resource operating status information RI of the terminal apparatus 13-*m* and transmits it to the distributed processing management server 17.

The resource operating status information RI includes, for example, used hours of the processing circuit 25, starting and finishing time of distributed processing of a project, IP address, available capacity of the memory 24, etc.

The distributed processing management server 17 stores the resource operating status information RI received from the terminal apparatus 13-*m* into the memory 54.

Step S32:

The processing circuit 55 of the distributed processing management server 17 reads out the resource operating status information RI received from all the terminal apparatuses 13-*m* at a given interval of time and generates the whole resource operating status information TRI which indicates the whole resource operating status configured by all the terminal apparatuses 13-*m*.

The processing circuit 55 may generates the whole resource operating status information TRI in which the operating status of the terminal apparatus 13-*m* is visually displayed.

Step S33:

The processing circuit 55 of the distributed processing management server 17 transmits the generated whole resource operating status information TRI to the terminal apparatus 13-*m*.

The processing circuit 25 of the terminal apparatus 13-*m* writes the received whole resource operating status information TRI into the memory 24.

Step S34:

The project processing server 11-*n* generates project progress status information which indicates project progress status based on the calculated results received from the terminal apparatus 13-*m* in step 26 shown in FIG. 8 and transmits it to the terminal apparatus 13-*m*.

The processing circuit 25 of the terminal apparatus 13-*m* writes the received project progress status information into the memory 24.

Step S35:

The processing circuit 25 of the terminal apparatus 13-*m* reads out the whole resource operating status information TRI and the project progress status information from the memory 24 and generates screen information including the above information which is displayed on one screen.

Figure 10:
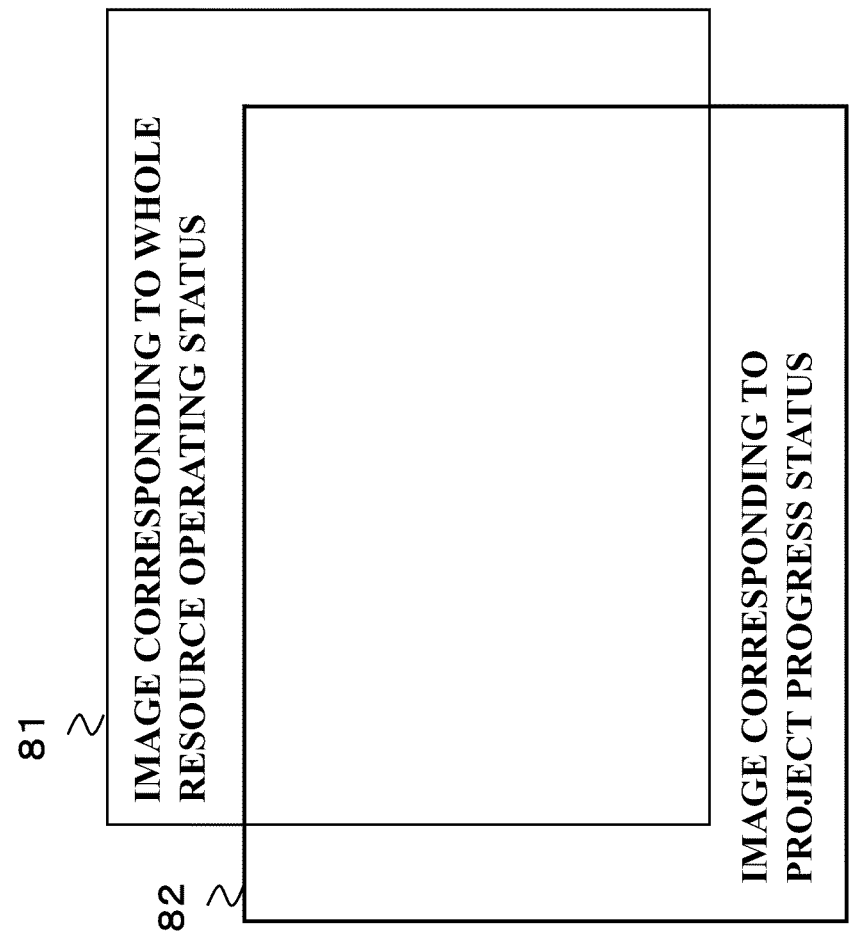
FIG. 10 is a schematic view of a screen displayed on a display of the terminal apparatus illustrated in FIG. 3.

The screen information, for example, is displayed as an image 81 corresponding to the whole resource operating status information TRI and as an image 82 corresponding to the project progress status information, with the images being overlapped on a screen as shown in FIG. 10. In the present embodiment, for example, the image 81 corresponding to the whole resource operating status information TRI is a background image and the image 82 corresponding to the project progress status information is a foreground image.

The image 81 corresponding to the whole resource operating status information TRI, for example, visually represents an instant value of the number of operating terminal apparatuses 13-*m*, or a sequential value of the same number, among the terminal apparatuses 13-*m* participating in the distributed processing project.

The image 82 corresponding to the project progress status information, for example, visually represents intermediate results of calculation performed by the terminal apparatuses 13-*m* in the distributed processing project. The image 82 may be a static image or a sequential image which changes according to progress of calculation.

In the present embodiment, a user of the terminal apparatus 13-*m* can watch participation information (statistic information) about worldwide terminal apparatuses 13-*m* participating in the project, as well as progress status of the project (application), with the image being overlapped. Therefore, motivation for participating in the project is enhanced.

That is, because each user can grasp participation status of worldwide users participating in the project and also operating status of distributed processing in each project, motivation for participating in the project is enhanced.

Note that the image 81 corresponds to the whole resource operating status information and the image 82 corresponds to the project progress status information. The two images may be overlapped on one screen, or may be located in different places on a screen, or may be displayed alternately.

Note that, the processing circuit 55 of the distributed processing management server 17 may perform calculation to share money among the terminal apparatuses 13-*m*. The money has been paid by a businessperson of the project processing server 11-*n* for the project processing which the terminal apparatuses 13-*m* participated in.

Further, the processing circuit 55 of the distributed processing management server 17 may perform operation to provide some benefits other than money to persons operating the terminal apparatus 13-*m* based upon the time having used the SPUs of the terminal apparatus 13-*m*.

As explained above, in the distributed processing system, the distributed processing management server 17 obtains the resource operating status information RI, which indicates an operating status of the terminal apparatus 13-*m* in distributed processing of each project. Additionally, the distributed processing management server 17 feeds, back to the terminal apparatus 13-*m*, the whole resource operating status information TRI, which indicates operating status of all the terminal apparatuses 13-*m* in the distributed processing of the project.

Therefore a user of the terminal apparatus 13-*m* can grasp how other terminal apparatuses 13-*m* are involved in the distributed processing project and can enhance their motivation for participation.

For example, a user of the terminal apparatus 13-*m* can grasp operating statuses of other terminal apparatuses 13-*m* in the distributed processing project in which he participates, as a result, he can have a feeling of joining the distributed processing project together with other people.

Accordingly, a terminal apparatus 13-*m*, for example, can understand operating statuses of other terminal apparatuses 13-*m* which are participating in different distributed processing projects in which the terminal apparatus does not participate, as a result, motivation for participating in the distributed processing project will be enhanced.

Further, in the distributed processing system, as previously described, the terminal apparatus 13-*m* obtains the project progress status information as well as the whole resource operating status information TRI and displays images corresponding to this information on one screen. Therefore, a user of the terminal apparatus 13-*m* can grasp operating status of other terminal apparatuses 13-*m* and the project progress status at the same time, as a result, he can really have outcome of participating in the distributed processing project.

Further, in the distributed processing system, because the distributed processing management server 17 performs assignment of tasks from the project processing server 11-*n* to the terminal apparatus 13-*m*, it is possible to perform suitable assignment, considering the whole virtual resource information of the terminal apparatus 13-*m*.

Because the distributed processing management server 17 can grasp a task assignment status, it can provide more useful information to the terminal apparatus 13-*m*, etc.

In the present embodiment, while the distributed processing management server 17 designates each terminal apparatus 13-*m* which participates in each distributed processing project, the distributed processing management server 17 may have a community function to support chatting among the terminal apparatuses 13-*m*.

Note that, when a plurality of terminal apparatuses 13-*m* perform the same task in connection, the distributed processing management server 17 may treat these terminal apparatuses 13-*m* as one unity and generate the whole resource operating status TRI in this way. This could produce new communication among participants and encourage them to compete with each other, resulting in increase of participants.

Second Embodiment

In the previous embodiment, as shown in FIG. 8 and other figures, the SPU code is generated by the project processing server 11-*n* and is downloaded to the terminal apparatus 13-*m* through the distributed processing management server 17. In the present embodiment, the SPU code is downloaded directly from the project processing server 11-*n* by the terminal apparatus 13-*m*.

Figure 11:
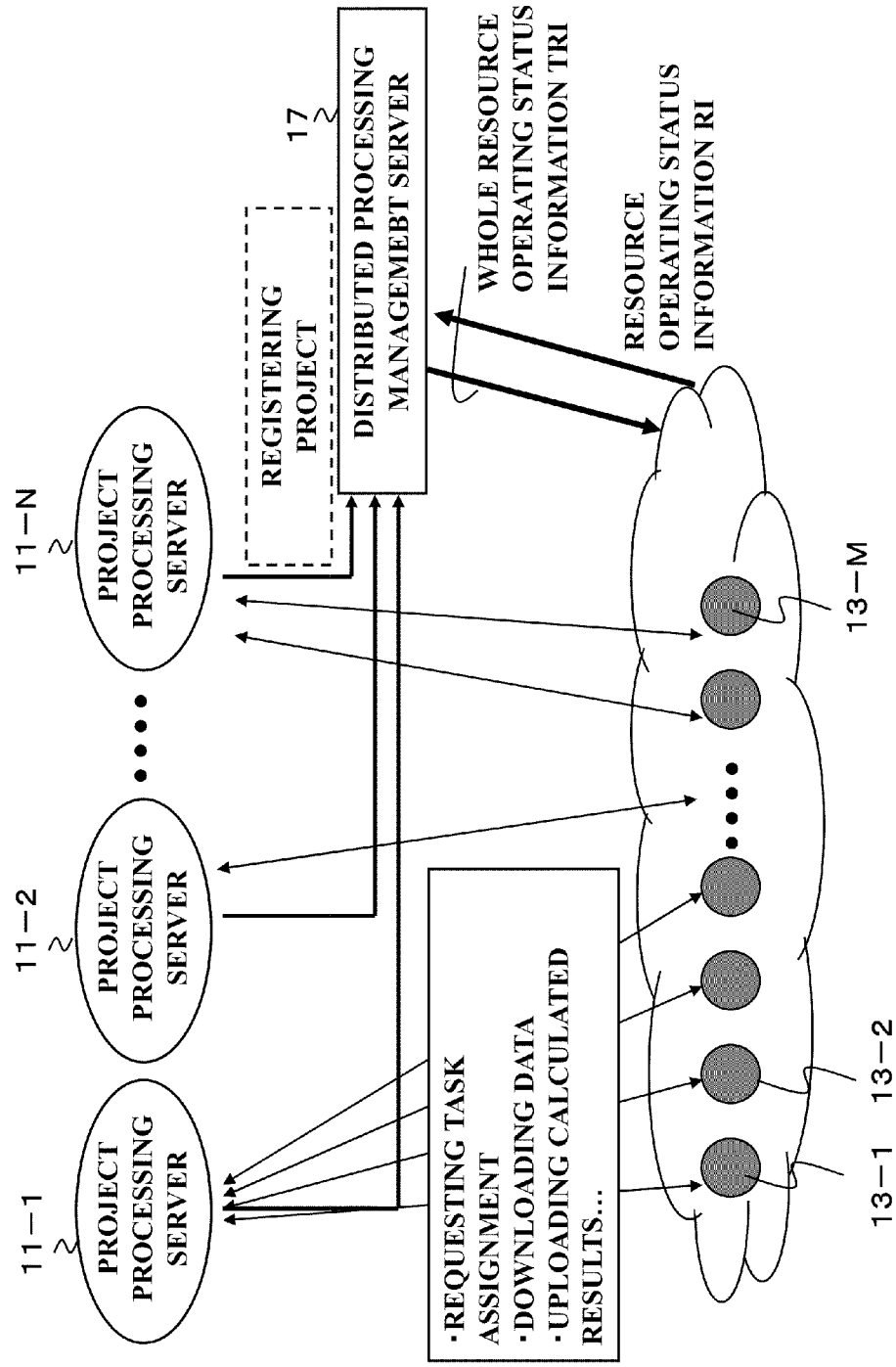
FIG. 11 is a schematic view of operation of a distributed processing system of a second embodiment in accordance with the present invention.

In the distributed processing system, for example, as shown in FIG. 11, a plurality of terminal apparatuses 13-*m* register their own resources to the project processing servers 11-*n* so as to allow the project processing servers 11-*n* to use the resources. The project processing server 11-*n* uses the terminal apparatus 13-*m* 's resources, for example, under a given condition and time. The terminal apparatus 13-*m* informs the distributed processing management server 17 of the terminal apparatus 13-*m* 's resource operating status information RI such as used time.

The terminal apparatus 13-*m* requests a task of a distributed processing project from the project processing server 11-*n* assigned to the terminal apparatus 13-*m* and downloads the task data. The terminal apparatus 13-*m* performs assigned calculation based on the downloaded data and uploads calculated results to the project processing server 11-*n*.

The terminal apparatus 13-*m*, as well as in the first embodiment, transmits the resource operating status information RI to the distributed processing management server 17. The distributed processing management server 17 generates the whole resource operating status information TRI based on the resource operating status information RI received from all the terminal apparatuses 13-*m* and transmits the TRI to the terminal apparatuses 13-*m*. The processing of the resource operating status information RI and the whole resource operating status information TRI is performed as well as in the first embodiment.

The following describes operation regarding distributed processing system of the present embodiment.

Figure 12:
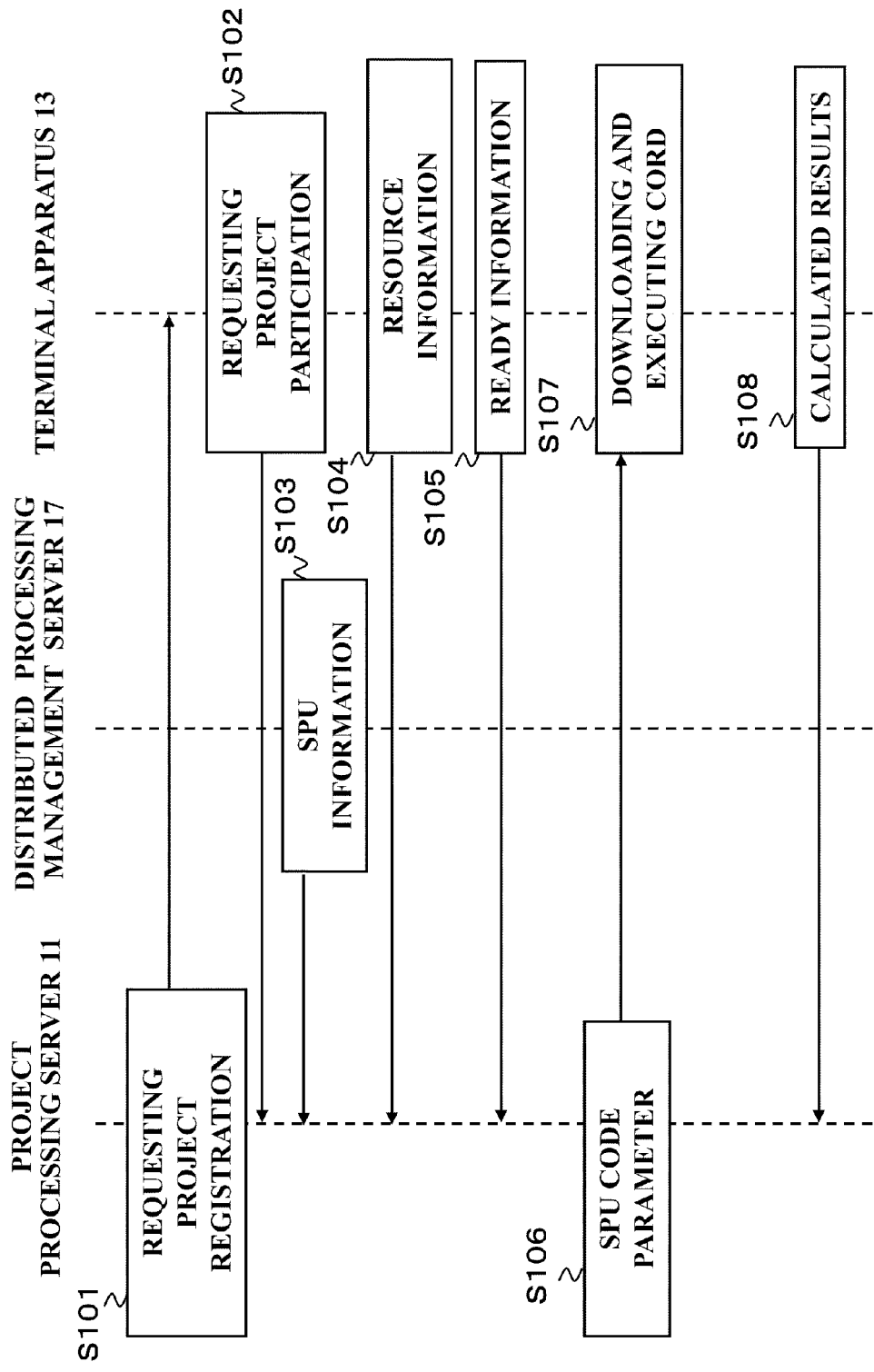
FIG. 12 is a flowchart of a process of task assignment of distributed processing of the distributed processing system illustrated in FIG. 11.

FIG. 12 is a flowchart of the distributed processing system in the present embodiment.

Step S101:

The project processing server 11-*n* transmits a request for registering a distributed processing project to be dealt with to the terminal apparatus 13-*m*. This registration request includes, for example, information on a project administrator, processing content, and so on.

Step S102:

The processing circuit 25 of the terminal apparatus 13-*m* displays, for example, information received from the project processing server 11-*n* in step S101 onto the display 22 of FIG. 3.

Then when a user operates the operation unit 23 and selects a desired project, the processing circuit 25 transmits a project participation request for participating in the selected project to the project processing server 11-*n*.

When the processing circuit 25 of the terminal apparatus 13-*m* allows participation of the terminal apparatus 13-*m* based on the project participation request, the processing circuit 25 makes the terminal apparatus 13-*m* download a program for implementing distributed processing.

Then the processing circuit 25 of the terminal apparatus 13-*m* starts the downloaded program and accesses the project processing server 11-*n*.

Step S103:

The processing circuit 55 of the distributed processing management server 17 transmits SPU information necessary for using the SPUs of the processing circuit 25 of the terminal apparatus 13-*m* to the project processing server 11-*n* through the interface 51.

The project processing server 11-*n* stores the received SPU information and uses this information for the distributed processing project.

Step S104:

The processing circuit 25 of the terminal apparatus 13-*m* transmits the circuit 25's resource information to the distributed processing management server 17 through the interface 21.

The resource information includes, for example, processing capability of the processing circuit 25, available memory capacity of the memory 24, transmission environment, etc.

The distributed processing management server 17 stores the resource information received from the terminal apparatus 13-*m* into the memory 54.

Step S105:

The processing circuit 25 of the terminal apparatus 13-*m* transmits a ready-status notice (task request) to the project processing server 11-*n* when the processing circuit 25 is able to perform distributed processing of the project. This notice is transmitted, for example, when the terminal apparatus 13-*m* is powered on or is in a status of non-operation for a given period.

Step S106:

The project processing server 11-*n* generates SPU code and parameters corresponding to the distributed processing of the project based on the SPU information received in step S103.

Step S107:

The processing circuit 25 of the terminal apparatus 13-*m* downloads the SPU code and parameters from the distributed processing management server 17 and writes the SPU code and parameters into the memory 24.

The processing circuit 25 reads out the SPU code and parameters from the memory 24 and writes the code and parameters and calculates in turn.

Step S108:

The processing circuit 25 of the terminal apparatus 13-*m* transmits the results calculated in step S107 to the project processing server 11-*n*.

The project processing server 11-*n* stores the calculated results received from the terminal server 13*m*.

As described above, in the distributed processing system, the SPU code and parameters are downloaded to the terminal apparatus 13-*m* directly from the project processing server 11-*n*.

Therefore, the distributed processing management server 17 can decrease its load.

Third Embodiment

The present embodiment describes one example of a screen, as shown in FIG. 10, which displays the overlapped images of the image 81 corresponding to the whole resource operating status and image 82 corresponding to a project progress status.

In the present embodiment, the processing circuit 55 of the distributed processing management server 17, shown in FIG. 6, finds positions of terminal apparatuses 13-*m* actually performing distributed processing projects, based on IP addresses included in the resource operating status information RI received from the terminal apparatuses 13-*m*.

At this time, the processing circuit 55 of the distributed processing management server 17 finds a user's position according to an IP address included in the resource operating information RI by referring to database (not shown) in which each IP address is related to a map position. The map positions are provider's positions such as Tokyo, Osaka, and London.

Then, the processing circuit 55 calculates the number of terminal apparatuses 13-*m* which are operating at each map position. The processing circuit 55 monitors the number by position. The number indicates the number of client's terminal apparatus 11-*n* which are processing each project in the map position.

The processing circuit 55 generates the whole resource operating status information TRI, in which the more the calculated number increases, the more the number of dots increases. The processing circuit 55 transmits the TRI to each terminal apparatus 13-*m*.

Note that, It is possible to make a diameter of a dot larger, as the number of operating terminal apparatuses 13-*m* is increasing. It is also possible to make brightness of a dot greater, as the number of operating terminal apparatuses 13-*m* is increasing.

The processing circuit 55 may display a mark except for a dot at a map position mentioned above. In this case the mark changes its size according to the number of operating terminal apparatuses 13-*m*. Alternatively, it is possible to place marks in a form of subdivided area. If the map position is Tokyo, marks may be placed at many positions over Kanto region. Consequently, the more the density of operating terminal apparatuses 13-*m* increases, the more the density of colored marks increases.

Further, the processing circuit 55 may generate the whole resource operating status information TRI which displays a past status during a past period of time (days) with colors as well as the current status.

Further, the processing circuit 55 may generate the whole resource operating status information TRI which displays different colored marks indicating statuses of different projects. In this case, distributed processing of a plurality of projects is being performed and each mark indicating the status of each project has a different color. Statuses of the plurality of projects are displayed on a map on one screen at the same time. Also, when the processing circuit 55 deals with a plurality of projects, it may generates the whole resource operating status information TRI which displays a status (including positions of terminal apparatuses 13-*m*, an operating-status history of distributed processing, etc) of each project independently or which displays statuses of all the projects together.

Further, the whole resource operating status information TRI generated by the processing circuit 55 may includes only statistical information such as the number of operating terminal apparatuses 13-*m* without including information on displaying forms. Accordingly, the displaying form may be determined on the terminal apparatus 13-*m*.

Further, when the project processing server 11-*n* deals with a project to identify a chemical formula, the project processing server 11-*n* generates project progress status information about displaying a part of the chemical formula and transmits the information to the terminal apparatus 13-*m*.

Further, when the terminal apparatus 13-*m* receives the project progress status information from each of project processing servers 11-*n* which deal with a plurality of projects, the terminal apparatus 13-*m* may display on the same screen a plurality of images corresponding to the projects at the same time. Alternatively, each of the images may be alternately displayed at a given interval of time. In this case, the terminal apparatus 13-*m* uses a background image corresponding to the project progress status information which is being displayed on the screen.

Figure 14:
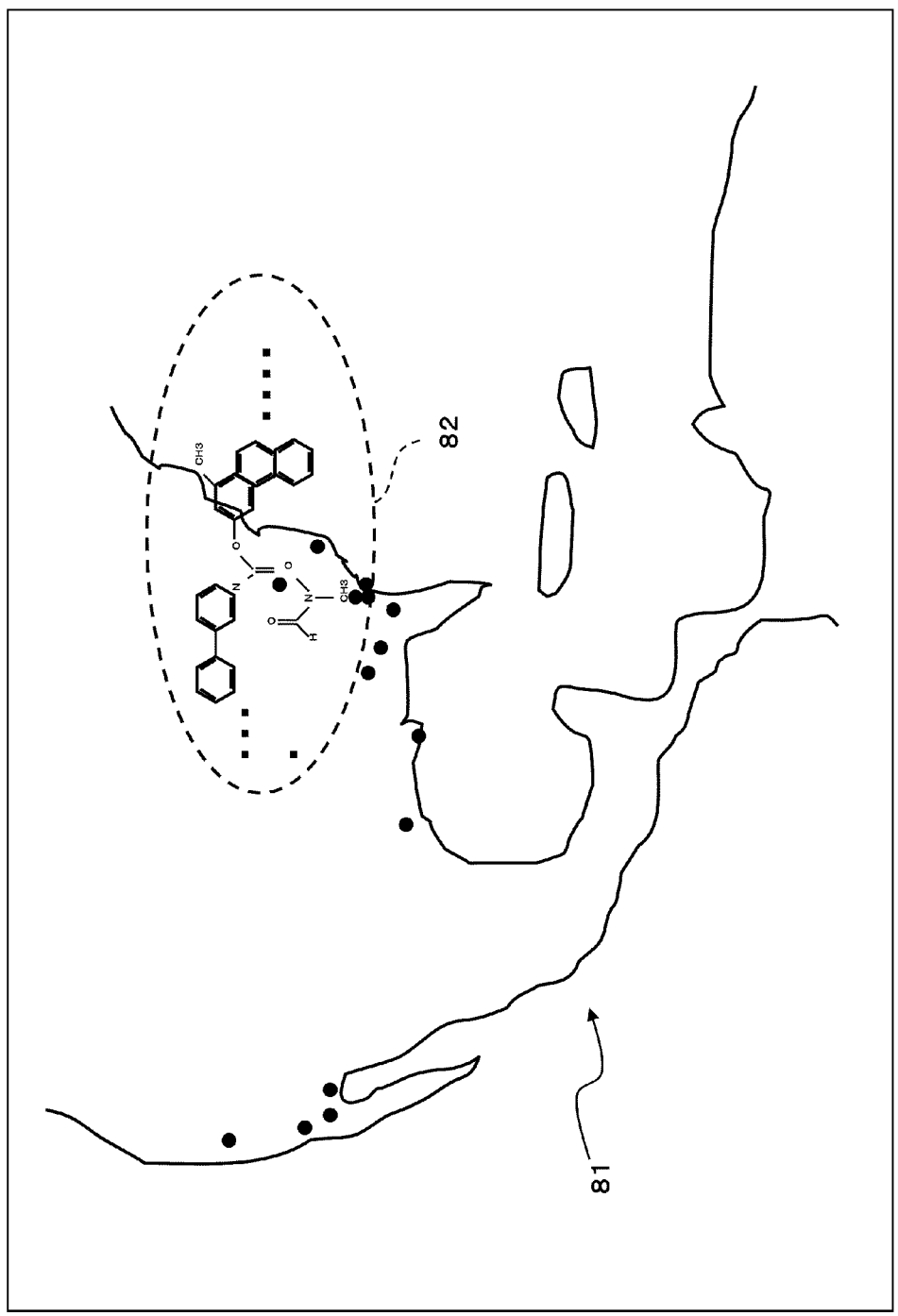
FIG. 14 is an image of before expansion displayed on a display of the terminal apparatus.
Figure 15:
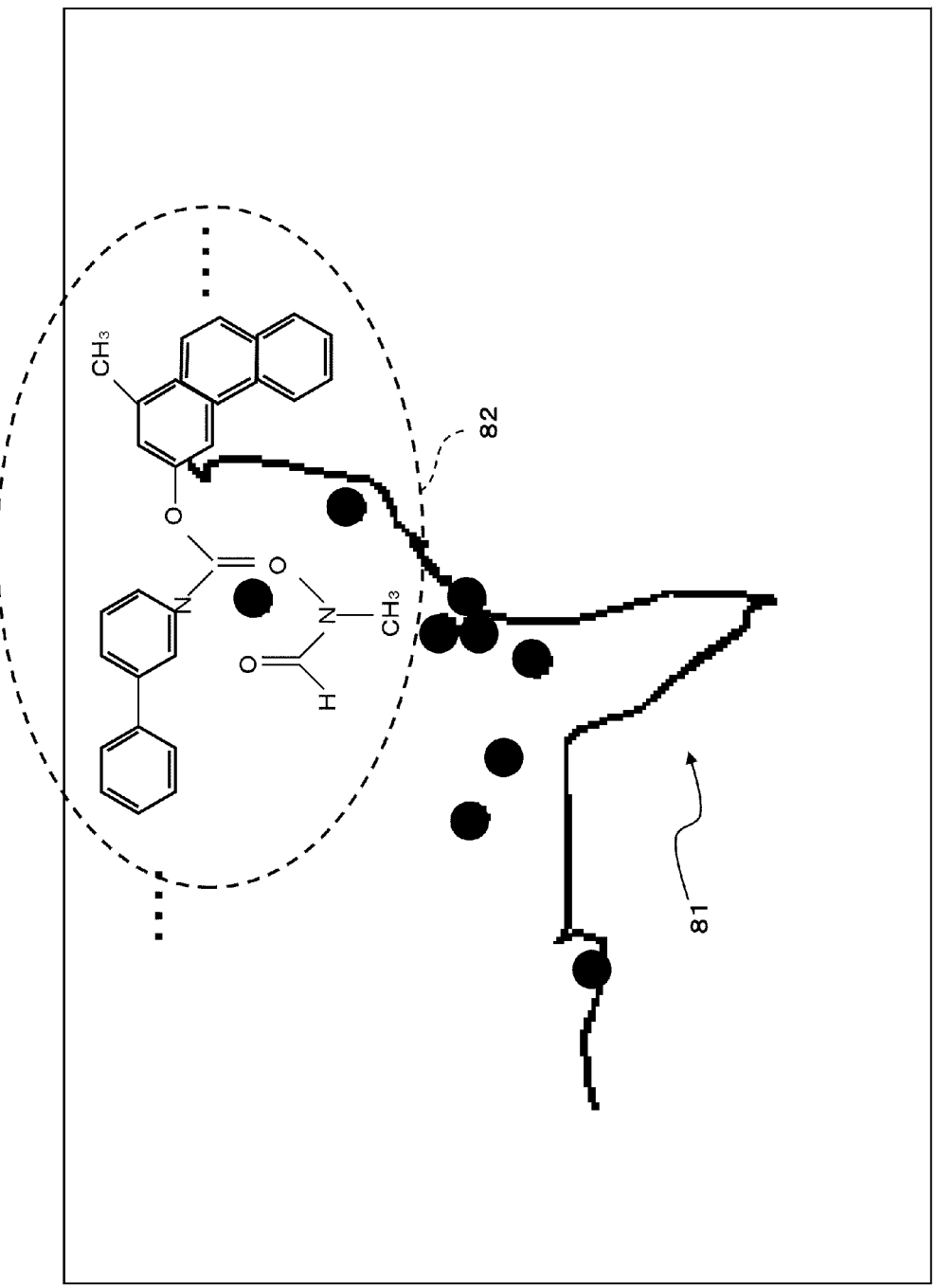
FIG. 15 is an image of after expansion displayed on the display of the terminal apparatus.

The processing circuit 25 of the terminal apparatus 13-*m* displays, based on the whole resource operating status information TRI received from the distributed processing management server 17, an image which has dots indicating the number of operating terminal apparatus 13-*m* at particular map positions, as shown in FIGS. 14 and 15. This image is one example of the image 81 which corresponds to the whole resource operating status information.

Here, if a user operates the operation unit 23 while he is displaying an image of FIG. 14 on the display 22 of the terminal apparatus 13-*m*, the processing circuit 25 displays on the display 22 an image of FIG. 15 which is a partial enlarged image of FIG. 14.

Further, the processing circuit 25 also displays a figure of a part of the chemical formula, the figure constituting an image 82 which corresponds to the project progress status information.

Figure 16:
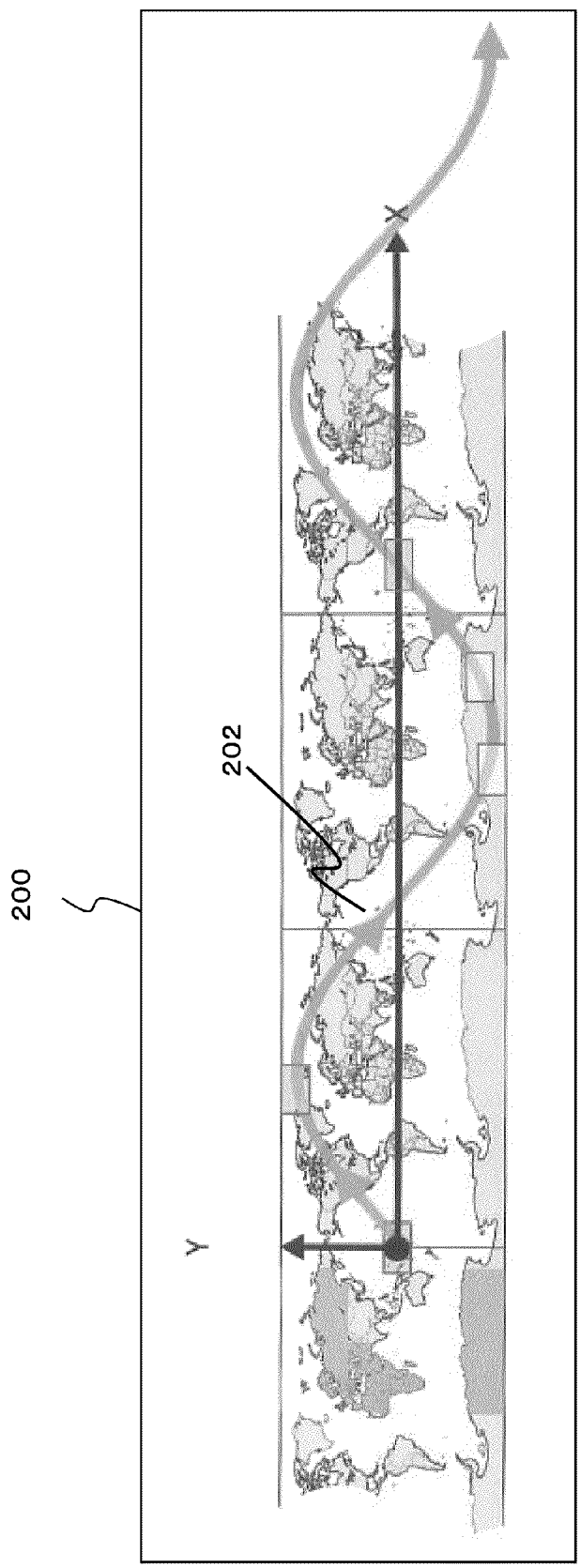
FIG. 16 is an image displayed on the display of the terminal apparatus.

Note that, the terminal apparatus 13-*m* may display a map image 200 of FIG. 16 on the display 22 of FIG. 3. When a user operates the operation unit 23 so as to move a cursor along a route 202, the terminal apparatus 13-*m* displays the images 81 and 82, shown in FIG. 14 or FIG. 15, which are linked to a particular map position.

The present invention is not limited to the above embodiments.

It will be appreciated by those skilled in the art which various modifications, combinations, subcombinations, and replacements may be made in part or all of the components within the technical scope and its equivalents of the present invention.

Figure 13:
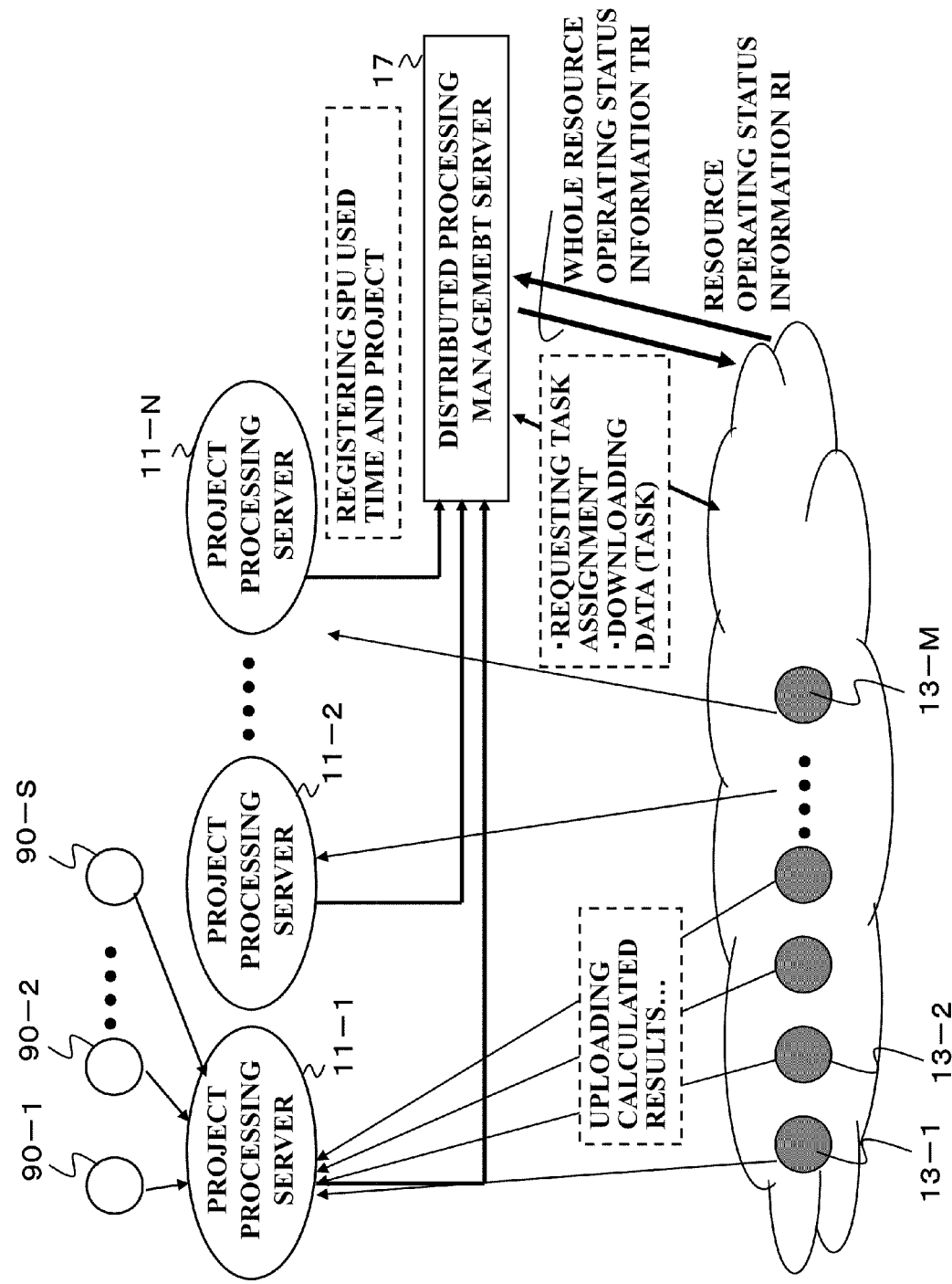
FIG. 13 is a schematic view of operation of a distributed processing system of a present embodiment.

In the embodiments mentioned above, the project processing servers 11-*n* perform distributed processing of a project by using only terminal apparatuses 13-*m* which are under control of the distributed processing management server 17. In the present embodiment, however, project processing servers 11-*n*, as shown in FIG. 13, may operate registered personal computers 90-*s* ($1 \leq s \leq S$) as well as the terminal apparatuses 13-*m* and make them download the SPU code and parameters and perform part of distributed processing of a project.

The project processing server 11-*n* obtains resource operating status information RI of the personal computer 90-*s* during distributed processing of the server 11-*n*'s project and transmits the resource operating status information RI to the distributed processing management server 17.

The distributed processing management server 17 generates the whole resource operating status information TRI based on total resource operating status information of the terminal apparatus 13-*m* and the personal computer 90-*s* and transmits the whole resource operating status information TRI to the terminal apparatus 13-*m*.

Accordingly, the terminal apparatus 13-*m* can grasp the operating status of the personal computer 90-*s* as well as of the terminal apparatus 13-*m* for distributed processing of the project in which the terminal apparatus 13-*m* participates.

Further, in the above embodiment, though each terminal apparatus 13-*m* performs each task of distributed processing project, a plurality of terminal apparatuses may process one task in cooperation with themselves if the task has a large quantity of calculation. In this case, the processing circuit 55 of the distributed processing management server 17 may displays the image 81, which corresponds to the whole resource operating status information, to the terminal apparatuses 13-*m* which are performing the same task. The display of the image 81 enables the terminal apparatuses 13-*m* to grasp the operating status of themselves.

Further, in the above embodiments, though the distributed processing management server 17 generates the whole resource operating status information TRI which includes image information, the distributed processing management server 17 may generate the TRI which includes only text information, and the terminal apparatus 13-*m* may generate image information based on the text TRI information.

Further, in the above embodiments, though each of the terminal apparatuses 13-*m* participates in the single distributed processing project, the terminal apparatus 13-*m* may participate in a plurality of distributed processing projects.

In this case, the terminal apparatus 13-*m* implements, in turn or in parallel, tasks of a plurality of distributed processing projects. The terminal apparatus 13-*m* displays on the display the resource operating status information about the participating distributed-processing projects in a way based on the whole resource operating status information TRI received from the distributed processing management server 17. Further, the terminal apparatus 13-*m* may display on the display the resource operating status information about non-participating distributed processing projects in a way based on the received TRI. Then the terminal apparatus 13-*m* may input the instruction for switching the distributed processing which user executes the task based on the display and executes operation for switching the distributed processing project which task processing is performed.

Further, the terminal apparatus 13-*m* may display on the display an image of the project progress status information about the participating distributed processing projects in a way based on the project progress status information received from the project processing server 11-*n*. Further, the terminal apparatus 13-*m* may displays on the display the project progress status information about the participating distributed processing projects which currently do not implement tasks in a way based on the received project progress status information.

The present invention is applicable to a distributed processing system.

EXPLANATION OF REFERENCE

11-*n* project processing server
13-*m* terminal apparatus
17 distributed processing management server
21, 51 interface
22, 52 display
23, 53 operation unit
24, 54 memory
25, 55 processing circuit
81 image corresponding to the whole resource operating status information
82 image corresponding to project progress status information

The invention claimed is:

1. A distributed processing method performing distributed processing of a predetermined application processing by a plurality of terminal apparatuses, comprising:
a distributed processing step in which said plurality of terminal apparatuses perform distributed processing of the data concerning said application processing provided by a first server, and provide said first server with a result of the processing;
a transmitting step in which said plurality of terminal apparatuses transmit an operating status data indicating operating status of said plurality of terminal apparatuses from said plurality of terminal apparatuses to a second server; and
an operating status transmitting step in which said second server generates a whole operating status data indicating said operating status of said plurality of terminal apparatuses on the basis of said operating status data received from said plurality of terminal apparatuses in said transmitting step, and transmits said whole operating status data to said terminal apparatus.

2. A distributed processing method of claim 1, wherein, in said operating status transmitting step, said second server generates said whole operating status data indicating said operating status of said terminal apparatus under operation visually among said plurality of terminal apparatuses, and transmits said whole operating status data to said terminal apparatus.

3. A distributed processing method of claim 1, further comprising:
a introduction step in which said second server transmits an introduction information about a plurality of said application processing to said terminal apparatus; and
a selection step in which said terminal apparatus selects said application processing to which said distributed processing is performed by said terminal apparatus on the basis of said introduction information received in said introduction step,
wherein, in said distributed processing step, said terminal apparatus receives data relating to said application processing selected in said selection step from said first server relating to said application processing.

4. A distributed processing method of claim 1, wherein, in said distributed processing step, said first server transmits the data relating to said application processing to said second server, and said second server transmits the data to said terminal apparatus.

5. A distributed processing method of claim 1, wherein, in said distributed processing step, said first server transmits the data relating to said application processing directly to said terminal apparatus.

6. A distributed processing method of claim 1, further comprising:
a progress status transmitting step in which said first server transmits a progress status data indicating the progress status of said application processing to said terminal apparatus; and
a screen information generation step in which based on said whole operating status data received in said operating status transmitting step and said progress status data received in said progress status transmitting step, a screen information displaying said whole operating status data and said progress status data on one screen.

7. A distributed processing system, comprising:
a plurality of terminal apparatus;
a first server which makes said plurality of terminal apparatuses perform distributed processing of a predetermined processing; and
a second server which receives an operating status data indicating operating status of said terminal apparatus from said plurality of said terminal apparatuses, generates a whole operating status data indicating said operating status of said plurality of terminal apparatuses based on the received operating status data, and transmits said whole operating status data to said terminal apparatus.

8. A server managing a plurality of terminal apparatuses which perform distributed processing of a predetermined application processing, comprising:
an interface for receiving an operating status data indicating operating status of said terminal apparatus from said plurality of terminal apparatuses; and
a processing circuit for generating a whole operating status data indicating said operating status of said plurality of terminal apparatuses on the basis of said operating status data received by said interface, and transmits said whole operating status data to said terminal apparatus through said interface.

9. A non-transitory, computer readable storage medium containing a program which is executed by a sever managing a plurality of terminal apparatuses performing distributed processing of a predetermined application, the program causing the server to perform steps, comprising:
receiving an operating status data indicating operating status of said terminal apparatus from said plurality of terminal apparatuses;
generating a whole operating status data indicating said operating status of said plurality of terminal apparatuses based on said operating status data received in said receiving step; and
transmitting said whole operating status data generated in said generating step to said terminal apparatus.

10. A non-transitory, computer readable storage medium storing a program which is executed by a sever managing a plurality of terminal apparatus performing distributed processing of the predetermined application, said program causing the server to perform steps, comprising:
receiving an operating status data indicating operating status of said terminal apparatus from said plurality of terminal apparatuses;
generating a whole operating status data indicating said operating status of said plurality of terminal apparatuses based on said operating status data received in said receiving step; and
transmitting said whole operating status data generated in said generating step to said terminal apparatus.

11. A computer comprising:
an interface for receiving a progress status data indicating progress status of application processing to which distributed processing has been performed and a whole operating status data indicating said operating status of a plurality of computers executing said application processing; and
a processing circuit for generating image information which displays a first image according to said progress status data received by said interface, and a second image according to said operating status data.

12. A computer of claim 11, wherein
said interface receives a processing target data relating to said distributed processing from a server managing said distributed processing; and
said processing circuit processes said processing target data received from said interface, transmits a result of the processing to said server, and transmits an operating status data indicating operating status of said computer to a server which provides said whole operating status data.

13. A computer of claim 11, wherein said processing circuit generates said image information displaying said first image and said second image on one screen.

* * * * *